United States Patent
Bieswanger et al.

(10) Patent No.: US 8,127,160 B2
(45) Date of Patent: Feb. 28, 2012

(54) DYNAMIC FREQUENCY AND VOLTAGE SCALING FOR A COMPUTER PROCESSOR

(75) Inventors: Andreas Bieswanger, Ehingen (DE); Andrew Geissler, Pflugerville, TX (US); Hye-Young McCreary, Liberty Hill, TX (US); Freeman L. Rawson, Austin, TX (US); Malcolm S. Ware, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 12/250,263

(22) Filed: Oct. 13, 2008

(65) Prior Publication Data
US 2010/0095137 A1    Apr. 15, 2010

(51) Int. Cl.
*G06F 1/32* (2006.01)
(52) U.S. Cl. .................... 713/321; 713/320
(58) Field of Classification Search .......... 713/300–324, 713/330, 340
See application file for complete search history.

(56) References Cited

U.S. PATENT DOCUMENTS
6,792,379 B2    9/2004 Ando
(Continued)

OTHER PUBLICATIONS
"U.S. Appl. No. 12/251,891 Office Action", Jun. 30, 2011, 19 pages.
(Continued)

*Primary Examiner* — Raymond Phan
(74) *Attorney, Agent, or Firm* — DeLizio Gilliam, PLLC (57) ABSTRACT

Dynamic frequency and voltage scaling for a computer processor, including retrieving information specifying a nominal operating point of frequency and voltage and an operating range of frequency and voltage for the processor; creating, by the power management module dynamically at run time in dependence upon the retrieved information, a table of frequency, voltage pairs, each pair specifying an operating point of frequency and voltage for the processor, each pair disposed upon a line drawn in frequency-voltage space through the nominal operating point between the minimum operating point and the maximum operating point, the distance between each pair defined in dependence upon a minimum change in power supply voltage supported by the power supply; and selecting and applying, by the power management module from the table, an operating voltage and frequency for the processor in dependence upon current operating conditions of the processor.

14 Claims, 6 Drawing Sheets

U.S. PATENT DOCUMENTS

| | | | |
|---|---|---|---|
| 7,194,645 B2 * | 3/2007 | Bieswanger et al. | 713/320 |
| 7,228,242 B2 | 6/2007 | Read et al. | |
| 7,444,526 B2 * | 10/2008 | Felter et al. | 713/300 |
| 7,447,602 B1 | 11/2008 | Bradley et al. | |
| 7,739,573 B2 | 6/2010 | DeMent et al. | |
| 2003/0071657 A1 | 4/2003 | Soerensen et al. | |
| 2003/0120961 A1 | 6/2003 | Cooper | |
| 2004/0128567 A1 | 7/2004 | Stewart | |
| 2006/0156040 A1 | 7/2006 | Naveh et al. | |
| 2007/0052453 A1 | 3/2007 | Wald | |
| 2009/0037712 A1 * | 2/2009 | Mallik et al. | 713/1 |
| 2009/0049220 A1 * | 2/2009 | Conti et al. | 710/267 |
| 2009/0049314 A1 * | 2/2009 | Taha et al. | 713/300 |
| 2009/0157936 A1 * | 6/2009 | Goss et al. | 710/264 |
| 2009/0177422 A1 | 7/2009 | Cox et al. | |
| 2009/0177903 A1 * | 7/2009 | Rozen et al. | 713/322 |
| 2009/0199019 A1 * | 8/2009 | Hongisto et al. | 713/300 |
| 2010/0094572 A1 | 4/2010 | Chase et al. | |
| 2010/0095137 A1 | 4/2010 | Bieswanger et al. | |
| 2010/0125436 A1 | 5/2010 | Chase et al. | |

OTHER PUBLICATIONS

Bose, Pradip et al., "Power-Efficient. Reliable Microprocessor Architectures: Modeling and Design Methods", May 2010 , pp. 299-304.

Hanumaiah, Vinay et al., "Maximizing Performance of Thermally Constrained Multi-core Processors by Dynamic Voltage and Frequency Control", Nov. 2009 , pp. 310-313.

Monticelli, Dennis M. , "Taking a System Approach to Energy Management", Sep. 16-18, 2003 , 5 pages.

U.S. Appl. No. 13/170,150, filed Jun. 27, 2011, Bery, Robert W., et al.

* cited by examiner

DYNAMIC FREQUENCY AND VOLTAGE SCALING FOR A COMPUTER PROCESSOR

BACKGROUND OF THE INVENTION

1. Field of the Invention

The field of the invention is data processing, or, more specifically, methods, apparatus, and products for dynamic frequency and voltage scaling for a computer processor.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

In today's computer systems, technological advances for higher performance have led to significantly increased power consumption and heat generation. Besides high energy costs this creates problems in datacenters with existing power delivery and air condition infrastructure limiting the deployment of additional new server systems or requiring expensive infrastructure upgrades. Within a computer system the processors are a key contributor to system power and heat generation. Faster frequencies and correspondingly leakier transistors are one reason for that. In order to limit and even counteract these effects, dynamic power and thermal management systems are getting developed to dynamically manage peak power and implement power saving mechanisms. Due to increasing variability in the manufacturing process of advanced semiconductor chips the upper and lower bounds of voltage/frequency pairs are specific to every chip. In prior art, however, there is no satisfactory mechanism that can characterize processor operating ranges or nominal operating points for each individual processor.

SUMMARY OF THE INVENTION

Methods, apparatus, and computer program products are disclosed for dynamic frequency and voltage scaling for a computer processor, the computer processor operatively coupled to a power supply and to a system clock, including retrieving, by a power management module at run time from non-volatile storage on the computer processor, information specifying a nominal operating point of frequency and voltage and an operating range of frequency and voltage for the processor, the operating range characterized by a minimum operating point, a maximum operating point, and the nominal operating point; creating, by the power management module dynamically at run time in dependence upon the retrieved information, a table of frequency, voltage pairs, each pair specifying an operating point of frequency and voltage for the processor, each pair disposed upon a line drawn in frequency-voltage space through the nominal operating point between the minimum operating point and the maximum operating point, the distance between each pair defined in dependence upon a minimum change in power supply voltage supported by the power supply; and selecting and applying, by the power management module from the table, an operating voltage and frequency for the processor in dependence upon current operating conditions of the processor.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
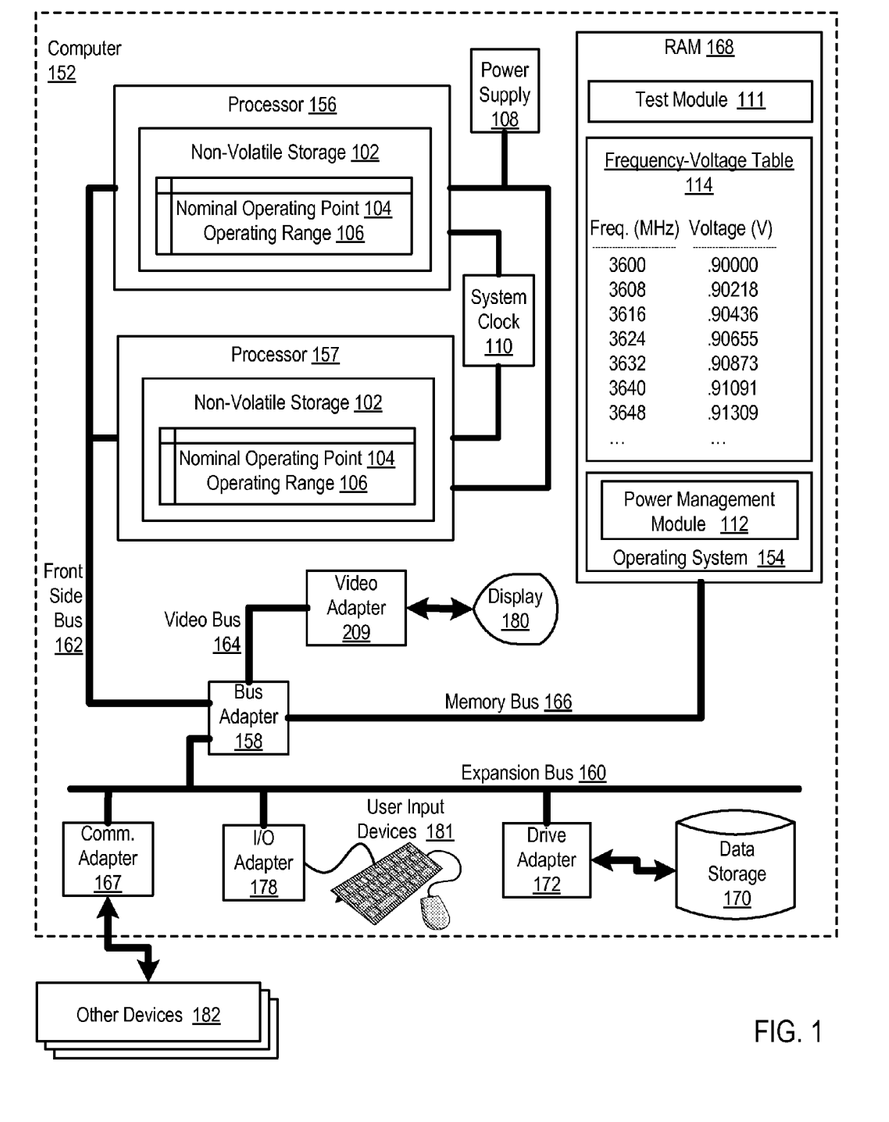
FIG. 1 sets forth a block diagram of automated computing machinery comprising an example computer useful in dynamic frequency and voltage scaling for a computer processor according to embodiments of the present invention.

Exemplary methods, apparatus, and products for dynamic frequency and voltage scaling for a computer processor in accordance with the present invention are described with reference to the accompanying drawings, beginning with FIG. 1. FIG. 1 sets forth a block diagram of automated computing machinery comprising an example computer (152) useful in dynamic frequency and voltage scaling for a computer processor according to embodiments of the present invention. The computer (152) of FIG. 1 includes two computer processors (156, 157) or 'CPU' as well as random access memory (168) (RAM') which is connected through a high speed memory bus (166) and bus adapter (158) to the processors (156, 157) and to other components of the computer (152). The example computer of FIG. 1 is illustrated with two computer processors for ease of explanation of certain aspects of the present invention and not as a general limitation on embodiments of the present invention. Computers may implement dynamic frequency and voltage scaling for any number of computer processors as may occur to those of skill in the art.

The computer (152) in this example implements frequency scaling for a computer processor generally according to embodiments of the present invention by its use in identifying (204) during manufacture a nominal operating point of frequency and voltage for a computer processor (156), where the nominal (104) operating point is characterized by a nominal (214) operating voltage identified for a design nominal operating frequency; determining (218), in dependence upon the nominal (104) operating point, an operating (106) range of frequency and voltage over which the computer processor (156) is to function; and storing, in non-volatile storage (102) on the computer processor during manufacture, information specifying the nominal operating point (104) and the operating range (106).

Stored in RAM (168) in the example computer of FIG. 1 are a test module (111), a power management module (112), a frequency-voltage table (114), and an operating system (154). The test module (111) is a module of user-level compute program instructions improved according to embodiments of the present invention to verify nominal operating points and nominal operating ranges of processors under manufacturing test. The power management module (112) is a module of system-level computer program instructions improved according to embodiments of the present invention to retrieve, at run time from non-volatile storage (102) on a computer processor, information specifying a nominal operating point (104) of frequency and voltage and an operating range (106) of frequency and voltage for the processor. The operating range typically is characterized by a minimum operating point, a maximum operating point, as well as the nominal operating point (104). The power management module (112) also creates, dynamically at run time in dependence upon the retrieved information, a table (114) of frequency, voltage pairs, where each pair specifying an operating point of frequency and voltage for the processor. Each pair is disposed upon a line drawn in frequency-voltage space through the nominal operating point between the minimum operating point and the maximum operating point, and the distance between each pair defined in dependence upon a minimum change in power supply voltage supported by the power supply (108). The power management module (112) also selects from the table (114) and applies an operating voltage and frequency for the processor in dependence upon current operating conditions of the processor.

Operating systems useful in dynamic frequency and voltage scaling for a computer processor according to embodiments of the present invention include UNIX™, Linux™, Microsoft XP™, AIX™, IBM's i5/OS™, and others as will occur to those of skill in the art. The operating system (154), the test module (111), the frequency-voltage table (114), and the power management module (112) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers that implement dynamic frequency and voltage scaling for a computer processor according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other devices (182), including, for example, other computers, data communications networks, and peripheral devices such as remote printers or remote data storage devices. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful in computers that implement dynamic frequency and voltage scaling for a computer processor according to embodiments of the present invention include modems for wired dial-up communications, Ethernet (IEEE 802.3) adapters for wired data communications network communications, and 802.11 adapters for wireless data communications network communications.

Figure 2:
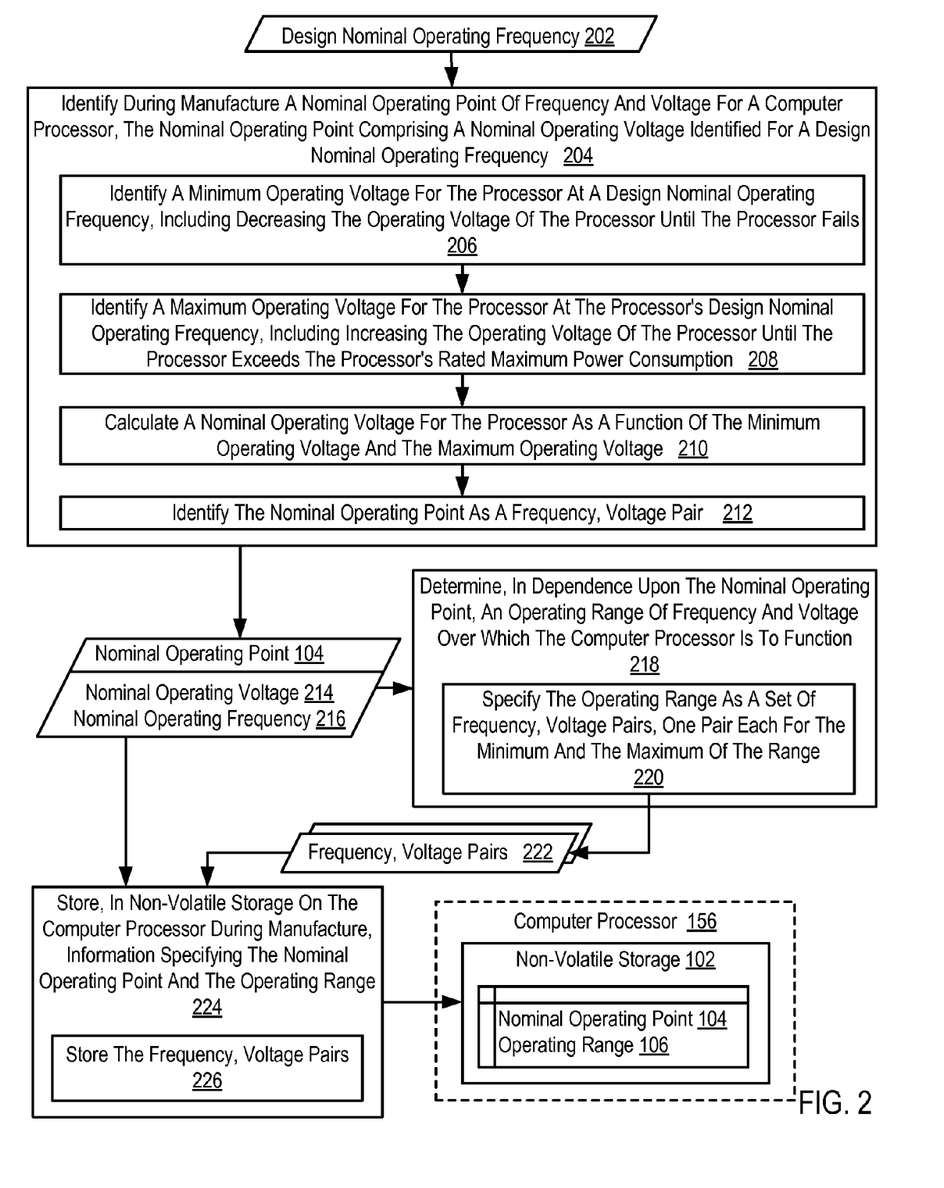
FIG. 2 sets forth a flow chart illustrating an exemplary method of dynamic frequency and voltage scaling for a computer processor according to embodiments of the present invention.

For further explanation, FIG. 2 sets forth a flow chart illustrating an exemplary method of dynamic frequency and voltage scaling for a computer processor according to embodiments of the present invention. The method of FIG. 2 is implemented with a programmable computer having one or more computer processors operatively coupled to computer memory, a computer similar to the one described above with reference to FIG. 1, for example. The method of FIG. 2 includes identifying (204) during manufacture a nominal operating point of frequency and voltage for a computer processor. A nominal operating point identifies an operating frequency of a computer processor and an operating voltage required to support such a computer processor when the computer processor is as intended for normal usage, neither particularly to save power nor particularly to accelerate performance: normal design operations. In the method of FIG. 2, the nominal (104) operating point includes a nominal (214) operating voltage identified for a design (202) nominal operating frequency. The nominal operating voltage specifies the voltage required to support operation of the processor at the design (202) nominal operating frequency. The design (202) nominal operating frequency is a design parameter of the computer processor. The nominal operating frequency for the computer processor can be determined in dependence upon, for example, the frequency ranges at which the processor can operate, optimal power and frequency benchmarks for the processor, worst case work loads expected to be placed on the processor, and worst case ambient conditions expected to be encountered by the processor. In the method of FIG. 2, it is the nominal operating voltage and the design (202) nominal operating frequency that define the nominal operating point.

In the method of FIG. 2, identifying (204) a nominal operating point includes identifying (206) a minimum operating voltage for the processor at a design nominal operating frequency, including decreasing the operating voltage of the processor until the processor fails. In the method of FIG. 2, the voltage supplied to the processor is iteratively decreased in incremental steps. As the operating voltage is decreased the operating frequency of the processor also decreases until the processor ultimately fails because the voltage being supplied to the processor is insufficient to reliably operate the processor. The minimum operating voltage is thereby determined to be the lowest possible voltage at which the processor can reliably operate. The operating frequency of the processor when the processor is receiving the minimum operating voltage is determined to be the minimum operating frequency.

In the method of FIG. 2, identifying (204) a nominal operating point also includes identifying (208) a maximum operating voltage for the processor at the processor's design nominal operating frequency, including increasing the operating voltage of the processor until the processor exceeds the processor's rated maximum power consumption. In the method of FIG. 2, the maximum operating voltage for the processor is the voltage supplied to the processor until the processor exceeds the processor's rated maximum power consumption. The maximum operating frequency is the frequency at which the processor is operating when supplied with such a maximum operating voltage.

In the method of FIG. 2, identifying (204) a nominal operating point also includes calculating (210) a nominal operating voltage for the processor as a function of the minimum operating voltage and the maximum operating voltage. Calculating a nominal operating point can be implemented, for example, by dividing the sum of the minimum operating voltage and the maximum operating by two. In such an example, the nominal operating voltage deviates from the minimum operating voltage and the maximum operating voltage by an identical amount. As an alternative method of calculating (210) a nominal operating voltage for the processor, a calculation may be implemented that results in the nominal operating voltage deviating from the maximum operating voltage by a smaller or larger amount than deviation between the nominal operating voltage and the minimum operating voltage. The examples of calculating (210) a nominal operating voltage for the processor as a function of the minimum operating voltage and the maximum operating voltage are included for the purpose of explanation only. Calculating (210) a nominal operating voltage for the processor as a function of the minimum operating voltage and the maximum operating voltage according to the present application may be carried out in any manner as will occur to those of skill in the art.

In the method of FIG. 2, identifying (204) a nominal operating point includes identifying (212) the nominal operating point (104) as a frequency, voltage pair (222). A frequency, voltage pair associates an operating frequency of a processor and an operating voltage that supports the operation of the processor at that frequency. Identifying (212) the nominal operating point (104) as a frequency, voltage pair can be carried out by creating a frequency, voltage pair that correlates the nominal operating frequency to the nominal operating voltage. Such a frequency, voltage pair can be implemented, for example, as an association between frequency and voltage fields in records of a table, as an entry in an array, in a linked list, in a C-style data structures, and in other way as will occur to those of skill in the art.

The method of FIG. 2 includes determining (218), in dependence upon the nominal (104) operating point, an operating (106) range of frequency and voltage over which computer processor (156) is to function. In the method of FIG. 2, determining an operating (106) range of frequency and voltage over which the computer processor (156) is to function may be carried out by identifying a minimum operating point and a maximum operating point that define the operating range (106). A minimum operating point can be determined, for example, by reducing the voltage supplied to a computer processor until the computer processor begins to fail. In such an example, the minimum operating point would be defined by the operating voltage that was supplied to the processor when the processor began to fail and the operating frequency of the processor when the processor began to fail. A maximum operating point can be determined, for example, by identifying the operating frequency of a computer processor when an operating voltage is supplied to the processor that is equal to the manufacturer specified voltage limit for the processor. An alternative example method of identifying a minimum operating point is to take the minimum operating frequency and the minimum operating voltage for a processor as a proportion of a nominal operating voltage and frequency, such as, for example 86%. In such an example, given a nominal operating voltage of 3.0 volts, the minimum operating voltage would be taken as 2.58 volts, and, given a nominal operating frequency of 4 Gigahertz, the minimum operating frequency would be 3.44 Gigahertz. Similarly, for a 10% variance from nominal for the maximum, given a nominal operating voltage of 3.0 volts, the maximum operating voltage would be taken as 3.3 volts, and, for a nominal operating frequency of 4 Gigahertz, the maximum operating frequency would be 4.4 Gigahertz.

In the method of FIG. 2, determining (218) an operating (106) range includes specifying (220) the operating range as a set of frequency, voltage pairs (222), one pair each for the minimum and the maximum of the range. The frequency, voltage pair for the minimum of the range includes a minimum operating frequency and a minimum operating voltage. The minimum operating frequency and minimum operating voltage can be determined, for example, by reducing the voltage supplied to a computer processor operating at the nominal operating point until the computer processor begins to fail. In such an example, the minimum operating voltage would be the voltage that was supplied to the processor when the processor began to fail and the minimum operating frequency would be the frequency at which the processor was operating when the processor began to fail. An alternative method of identifying minimum operating point is to take the minimum operating frequency and voltage as a proportion of a nominal operating voltage and frequency, such as, for example 86%. In such an example, given a nominal operating voltage of 3.0 volts, the minimum operating voltage would be taken as 2.58 volts, and, given a nominal operating frequency of 4 Gigahertz, the minimum operating frequency would be 3.44 Gigahertz.

The method of FIG. 2 includes storing (224), in non-volatile (102) storage on the computer processor during manufacture, information specifying the nominal (104) operating point and the operating (106) range. Non-volatile storage, as the term is used in the present application, is computer memory that does not require an external source of power to retain data stored in the computer memory, such as, for example, programmable read-only memory. Information that specifies the nominal (104) operating point includes the nominal operating voltage and the nominal operating frequency of a computer processor. Information that specifies the operating (106) range includes a minimum operating voltage, minimum operating frequency, maximum operating voltage, and a maximum operating frequency. In the method of FIG. 2, storing (224) information specifying the nominal (104) operating point and the operating (106) range includes storing (226) that information in the form of frequency, voltage pairs (222).

Figure 3A:
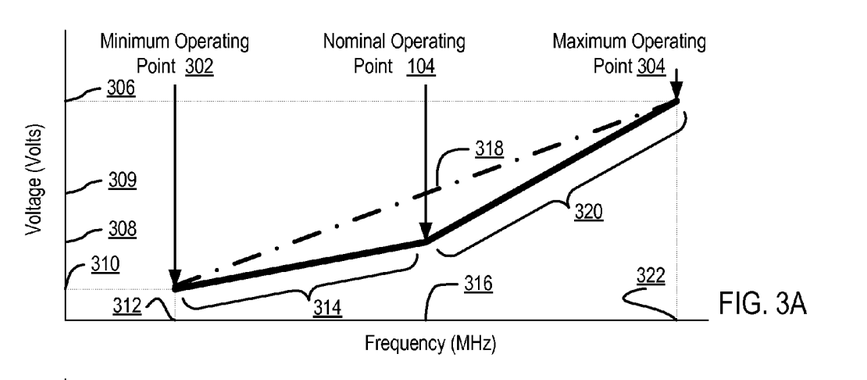
FIG. 3A sets forth a chart illustrating graphical representation of an example operating range according to embodiments of the present invention.

For further explanation, FIG. 3A sets forth a chart illustrating graphical representation of an example operating range according to embodiments of the present invention. In the example of FIG. 3A, the operating range is characterized by a minimum operating point (302), a maximum operating point (304), and the nominal operating point (104). In the example of FIG. 3A, the minimum operating point (302), the maximum operating point (304), and the nominal operating point (104) are specified by frequency, voltage pairs. The frequency, voltage pair characterizing the minimum operating point includes the minimum operating voltage (310) and the minimum operating frequency (312). The frequency, voltage pair characterizing the nominal operating point includes the nominal operating voltage (308) and the nominal operating frequency (316). The frequency, voltage pair characterizing the maximum operating point includes the maximum operating voltage (306) and the maximum operating frequency (322).

In the example of FIG. 3A, the frequency, voltage pairs of the minimum operating point, the nominal operating point, and the maximum operating point are disposed in frequency-voltage space (FIG. 3A) so that a line (314) drawn in frequency-voltage space from the minimum operating point (302) to the nominal operating point (104) has a slope that is different from the slope of a line (320) drawn between the nominal operating point (104) and the maximum operating point (304). In embodiments of the present application where the a line (314) between the minimum operating point (302) and the nominal operating point (104) has a slope that is different from the slope of a line (320) between the nominal operating point (104) and the maximum operating point (304), more efficient power usage is achieved by defining the operating range as the combination of the two lines (314, 320) rather than as a single line (318) running from the minimum operating point (302) to the maximum operating point (304). In the example of FIG. 3A, more efficient power usage is exhibited, for example, when the processor is operating at the nominal operating frequency (316). In such a case, an operating range defined by a single line (318) running from the minimum operating point (302) to the maximum operating point (304) would result in a higher operating voltage (309) than the actual nominal operating voltage (308) required to support a processor operating at the nominal operating frequency (316). Moreover, as the processor is accelerated, the slope of line (320) provides a more accurate representation of the capability of the processor at power levels approaching the maximum than is provided by a line (318) drawn directly from the minimum to the maximum.

Figure 4:
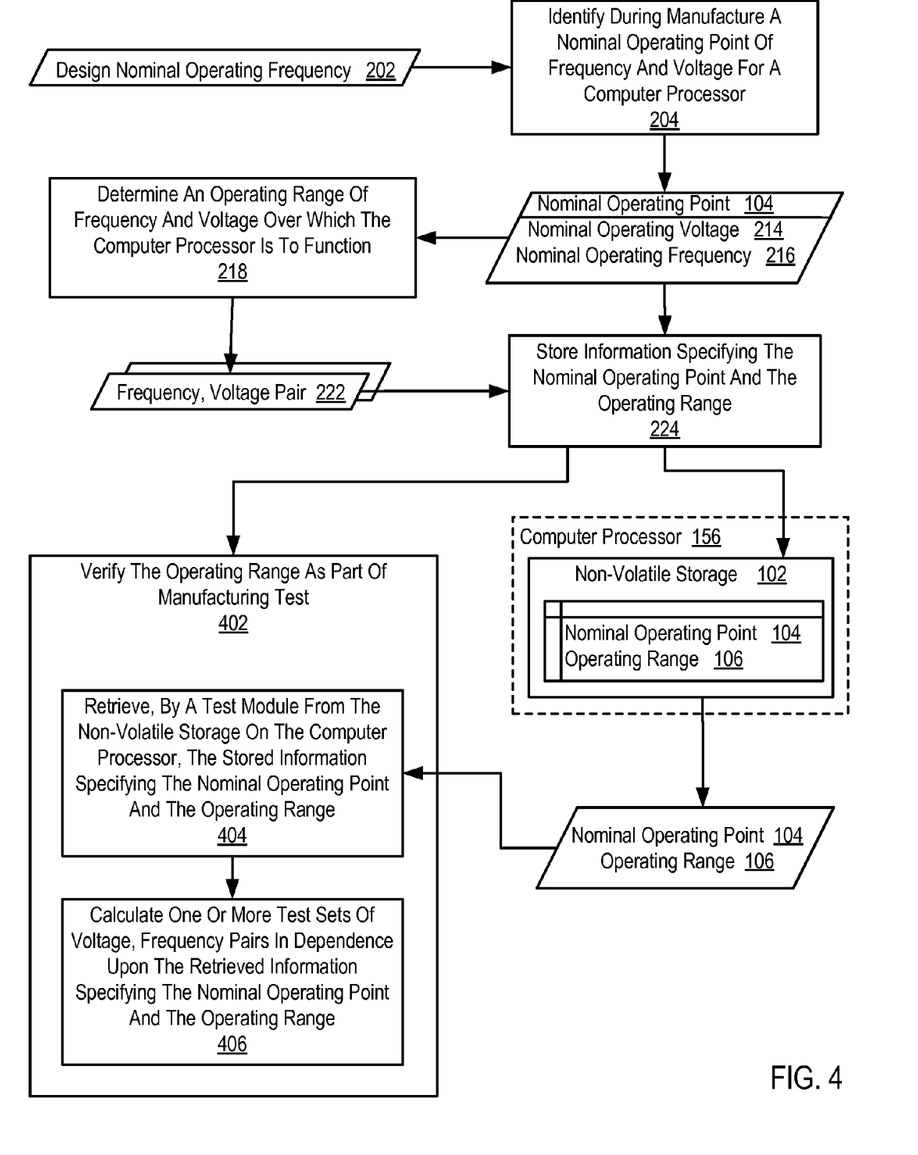
FIG. 4 sets forth a flow chart illustrating a further exemplary method of dynamic frequency and voltage scaling for a computer processor according to embodiments of the present invention.

For further explanation, FIG. 4 sets forth a flow chart illustrating a further exemplary method of dynamic frequency and voltage scaling for a computer processor according to embodiments of the present invention. The method of FIG. 4 is similar to the method of FIG. 2, implemented with a computer similar to the one described above with reference to FIG. 1 and including as it does, identifying (204) the nominal (104) operating point, determining (218) an operating (106) range of frequency and voltage over which the computer processor (156) is to function, and storing (224) information specifying the nominal (104) operating point and the operating (106) range.

The method of FIG. 4, however, also includes verifying (402) the operating range as part of manufacturing test of a processor. In the method of FIG. 4, verifying (402) the operating range includes retrieving (404), by a test module (111 on FIG. 1) from the non-volatile storage on a computer processor, stored information specifying the nominal operating point and the operating range. The test module includes a set of computer program instructions capable of retrieving information from the non-volatile storage on the computer processor. The stored information specifying the nominal operating point and the operating range that is retrieved by the test module can include, for example, a nominal operating voltage, a nominal operating frequency, a minimum operating voltage, a minimum operating frequency, a maximum operating voltage, and a maximum operating frequency.

The method of FIG. 4 also includes calculating (406) one or more test sets of voltage, frequency pairs in dependence upon the retrieved information specifying the nominal operating point and the operating range. Calculating one or more test sets of voltage, frequency pairs in dependence upon the retrieved information can be carried out, for example, by calculating voltage, frequency pairs at set voltage intervals between the respective operating points. Consider an example in which the nominal operating frequency is 4 GHz, the nominal operating voltage is 3 volts, the minimum operating voltage is 2.2 volts, the minimum operating frequency is 3 GHz, the maximum operating voltage is 3.8 volts, and the maximum operating frequency is 5 GHz. In such an example, calculating (406) one or more test sets of voltage, frequency pairs in dependence upon the retrieved information specifying the nominal operating point and the operating range can be carried out by calculating expected voltage, frequency pairs for each interval of 0.2 volts between the respective operating points. Such a calculation would yield the following test set of voltage, frequency pairs:

TABLE 1

| Test Point | Voltage (V) | Frequency GHz) |
|---|---|---|
| 1 | 2.4 | 3.25 |
| 2 | 2.6 | 3.50 |
| 3 | 2.8 | 3.75 |
| 4 | 3.2 | 4.25 |
| 5 | 3.4 | 4.50 |
| 6 | 3.6 | 4.75 |

In the test set of Table 1, test points 1, 2, and 3 represent the expected operating frequencies for each 0.2 volt increment between the minimum operating voltage and the nominal operating voltage. Test points 4, 5, and 6 represent the expected operating frequencies for each 0.2 volt increment between the nominal operating voltage and the maximum operating voltage. The expected operating frequencies in the example above are calculated by assuming a proportional increase in operating frequency for each increase in operating voltage. The example described above is included for the purposes of explanation and not limitation. Calculating one or more test sets of voltage, frequency pairs in dependence upon the retrieved information according to embodiments of the present application can be carried out within the scope of the present invention in any manner as will occur to those of skill in the art.

Figure 5:
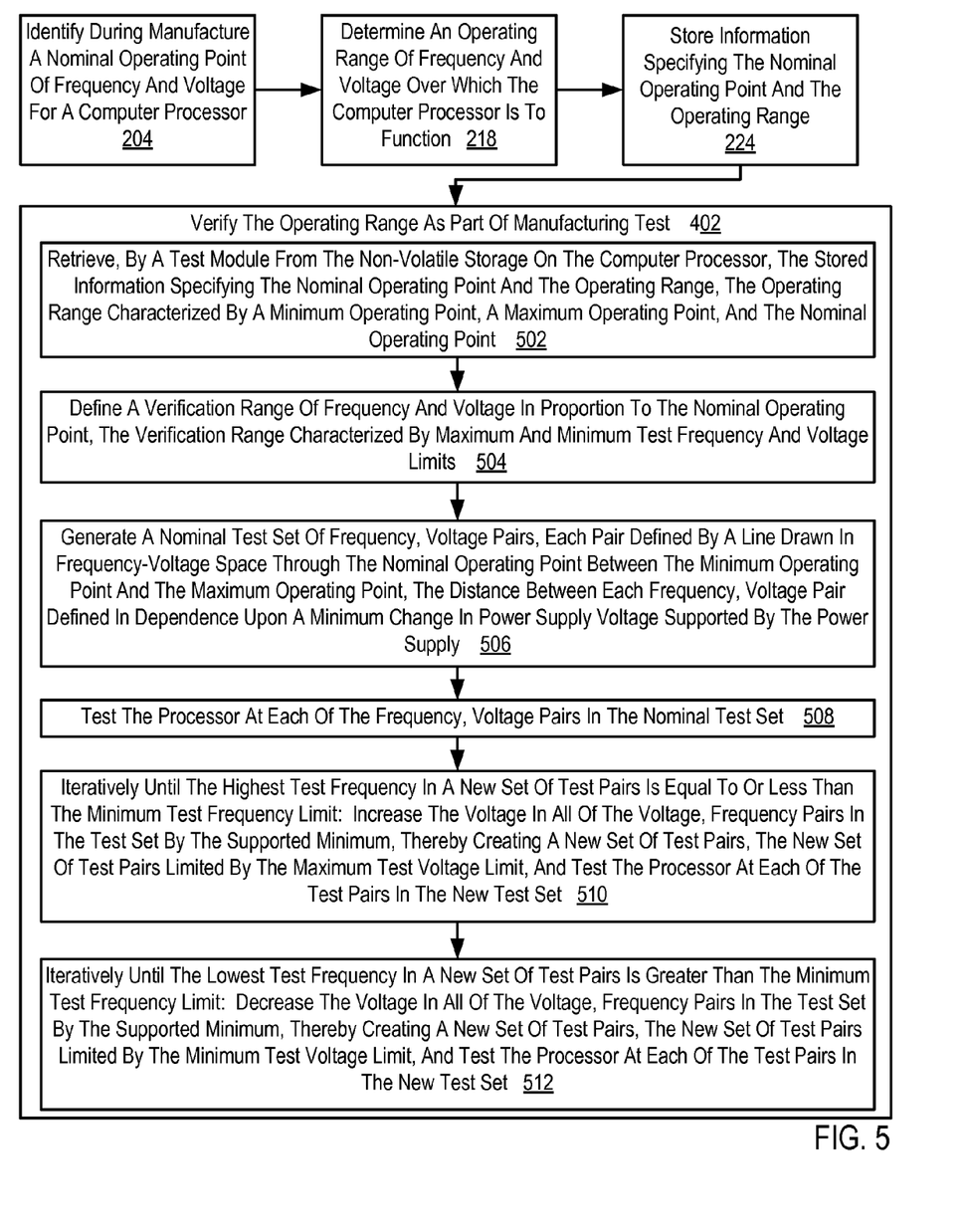
FIG. 5 sets forth a flow chart illustrating a further example method of dynamic frequency and voltage scaling for a computer processor according to embodiments of the present invention.

FIG. 5 sets forth a flow chart illustrating a further example method of dynamic frequency and voltage scaling for a computer processor according to embodiments of the present invention. The method of FIG. 5 is described in this application with reference both to FIG. 5 and also with reference to the graphs depicted in FIGS. 3B and 3C. The method of FIG. 5 is similar to the method of FIG. 2, implemented on a computer like the one described above with reference to FIG. 1, with the computers processor or processors coupled for operation to a system clock and a power supply, and including as it does, identifying (204) the nominal (104) operating point, determining (218) an operating (106) range of frequency and voltage over which the computer processor (156) is to function, and storing (224) information specifying the nominal (104) operating point and the operating (106) range.

The method of FIG. 5, however, also includes verifying (402) the operating range as part of manufacturing test. The verification in this example is carried out generally by a test module (111 on FIG. 1), a module of user-level computer program instructions that carries out the verification of the operating range as part of manufacturing test of the processor. In the method of FIG. 5, verifying (402) the operating range includes retrieving (502), by the test module from non-volatile storage on the computer processor, stored information specifying the nominal operating point and the operating range for the computer processor. In the method of FIG. 5, the operating range is characterized by a minimum operating point, a maximum operating point, and the nominal operating point. A minimum operating point can include, for example, a minimum operating voltage and a minimum operating frequency. A maximum operating point can include, for example, a maximum operating voltage and a maximum operating frequency. A nominal operating point can include, for example, a nominal operating voltage and a nominal operating frequency.

In the method of FIG. 5, verifying (402) the operating range also includes defining (504) a verification range of frequency (325) and a verification range of voltage (323), with both ranges defined in proportion to the nominal operating point (104). The verification range is characterized by maximum and minimum test frequency and voltage limits. Defining a verification range of frequency and voltage in proportion to the nominal operating point can include, for example, setting the maximum test voltage limit (324 on FIGS. 3B and 3C) to be 10% above the nominal operating voltage and setting the minimum test voltage limit (330 on FIGS. 3B and 3C) to be 5% below the nominal operating voltage. Defining a verification range of frequency and voltage in proportion to the nominal operating point can also include, for example, setting the maximum test frequency limit (328 on FIGS. 3B and 3C) to be 10% above the nominal operating frequency and setting the minimum test frequency limit (326 on FIGS. 3B and 3C) to be 5% below the nominal operating frequency. Such a verification range of frequency and voltage defines the voltage, frequency pairs that can be tested by the test module.

In the method of FIG. 5, verifying (402) the operating range also includes generating (506) a nominal test set of frequency, voltage pairs, each pair defined by a line (327 on FIG. 3B) drawn in frequency-voltage space through the nominal operating point (104) between the minimum operating point (302) and the maximum operating point (304) for the processor. The line (327) is depicted as continuous, but in fact is formed by a number of discrete frequency, voltage pairs each of which has some distance in frequency-voltage space between itself and its neighboring pair or pairs. In the method of FIG. 5, the distance between frequency, voltage pairs is defined in dependence upon a minimum change in power supply voltage supported by the power supply. The minimum change in power supply voltage supported by the power supply can be a function of the power supply itself or can be determined by the minimum supported change in clock frequency. Consider, for example, an embodiment of the present application in which the power supply supports voltage steps of 0.001 Volts and the clock frequency can only be changed in intervals of 100 MHz. In such an example, assume that the change in operating voltage required to support an operating frequency change of 100 MHz is greater than 0.001 Volts. In this an example, the allowable clock frequency increments will limit the minimum change in power supply voltage because the power supply must increment voltage by more than 0.001 Volts to change the operating frequency and reach a new voltage, frequency pair in the nominal test set. Note that in this example, the nominal test set is defined according to the segment (303) of the defining line (327) within the verification range (325, 323) of frequency and voltage designated for the test. That is, in this example, the nominal test set does not test the entire range between the minimum operating point (302) and the maximum operating point (304) for the processor under test. Indeed there is no requirement in the scope of the present invention that a verification range be the same as the operating range for a processor. The size of the verification range may be influenced, for example, by the intended operating environment of the processor under test, temperatures, humidity levels, worst case operating loads, and so on, and, as in this example, may or may not be the same as the operating range. The nominal test set is defined by the line between minimum operating point and maximum operating point, but the nominal test need not include all operating points between the minimum operating point and the maximum operating point.

In the method of FIG. 5, verifying (402) the operating range also includes testing the processor at each of the frequency, voltage pairs in the nominal test set. The test module may run a test program on the processor, for example, and, while the test program continues to run without interruption when the test module steps between operating points, start at the lowest operating point, test from lowest to highest operating point in the nominal test set, then reverse the process and step from the highest operating point in the test set to the lowest. In stepping up through the operating points, the test module steps to a higher operating point by first increasing the voltage to the voltage in the frequency, voltage pair of the next higher operating point in the test set, and then increasing the frequency to the frequency in the higher next frequency, voltage pair. Higher frequencies require higher voltages for proper operation of the processor. Stepping up the voltage first reduces the risk of artificially inducing a failure merely because the processor correctly by design requires the next voltage before it can operate at the next frequency. For the same reason, in stepping down through the operating points in the nominal test set, the test module steps down to a lower operating point by first decreasing the frequency to the frequency in the frequency, voltage pair of the next lower operating point in the test set, and then decreasing the voltage to the voltage in the next lower frequency, voltage pair.

Figure 3B:
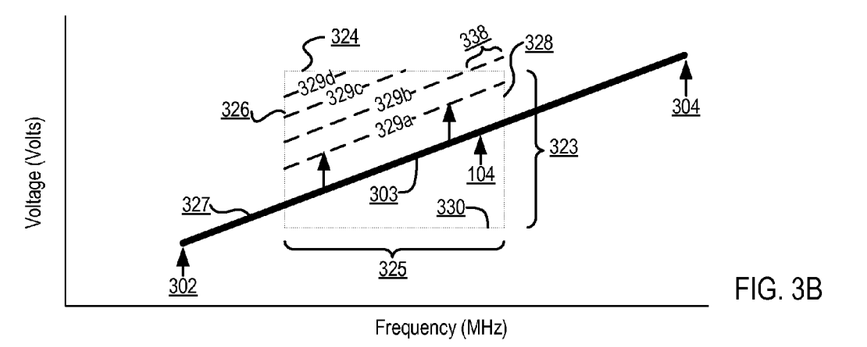
FIG. 3B sets forth line graphs of test sets created by iteratively increasing the voltage in all of the frequency, voltage pairs in a test set.

In the method of FIG. 5, verifying (402) the operating range also includes iteratively increasing (510) the voltage in all of the voltage, frequency pairs in the test set by the supported minimum change in power supply voltage, creating a new set of test pairs, and testing the processor at each of the test pairs in the new test set—iteratively continuing this process until the maximum test frequency in a new set of test pairs is equal to or less than the minimum test frequency limit (326). FIG. 3B sets forth line graphs of test sets created by iteratively increasing the voltage in all of the frequency, voltage pairs in a test set. Each new set of test pairs is limited by the maximum test voltage limit (324), so that no new test pair is permitted to contain any frequency, voltage pairs having voltages higher than the maximum test voltage limit. In the test set represented by line (329b), for example, the subset of frequency, voltage pairs represented by line segment (338) are excluded from the test set represented by line (329b)

because each frequency, voltage pair in the subset (338) has a voltage higher than the maximum test voltage limit (324).

In the method of FIG. 5, iteratively increasing the voltage in all of the voltage, frequency pairs in the test set by the supported minimum change in power supply voltage supported by the power supply generates new set of test pairs (329*a*, 329*b*, 329*c*, and 329*d*). Because the voltage of all test pairs is iteratively increased, the voltage specified in higher-voltage test pairs eventually exceeds the maximum test voltage (324) and such test pairs are excluded from a newly created test set—because of the limitation described above. In the graph depicted on FIG. 3B, for example, test set 329*a* includes more test pairs with voltages that are lower maximum test voltage than the than test set 329*b*, test set 329*b* includes more test pairs with voltages that are lower maximum test voltage than test set 329*c*, and so on. As test pairs are removed from the test set because the voltage specified in a given test pair exceeds the maximum testing voltage, the maximum frequency specified by any of the test pairs in a new test set is reduced. In the graph depicted on FIG. 3B, for example, test set 329*a* includes a test pair that specifies a higher frequency than any of the test pairs in test set 329*b*, test set 329*b* includes a test pair that specifies a higher frequency than any of the test pairs in test set 329*c*, and so on. Because the maximum frequency specified by any of the test pairs in a new test set continues to decrease, the maximum frequency specified by any of the test pairs in a new test set effectively steps across the maximum voltage limit line (324) from right to left, coming closer and closer to the minimum test frequency (326) with each new test set, until eventually it becomes less than or equal to the minimum test frequency (326). In the method of FIG. 5, when the maximum test frequency in a new set of test pairs is equal to or less than the minimum test frequency limit (326), the iterative increasing of voltage in all of the voltage, frequency pairs is halted and reversed to begin stepping test sets back down through the verification range as described below with reference to FIGS. 5 and 3C.

Figure 3C:
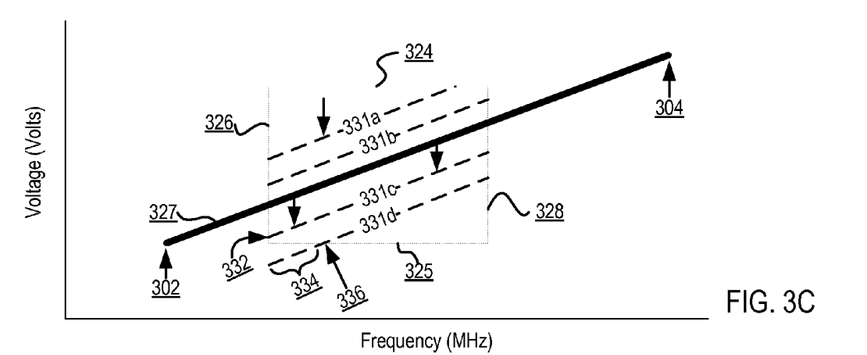
FIG. 3C sets forth line graphs of test sets created by iteratively decreasing the voltage in all of the frequency, voltage pairs in a test set.

In the method of FIG. 5, verifying (402) the operating range also includes iteratively decreasing (512) the voltage in all of the voltage, frequency pairs in the test set by the supported minimum change in power supply voltage, creating a new set of test pairs, and testing the processor at each of the test pairs in the new test set—iteratively continuing this process until the minimum test frequency in a new set of test pairs is greater than the minimum test frequency limit. FIG. 3C sets forth line graphs of test sets created by iteratively decreasing the voltage in all of the frequency, voltage pairs in a test set. In the method of FIG. 5, each new set of test pairs is limited by the minimum test voltage limit—limited in the sense that the lowest frequency in any frequency, voltage pair in a new test set is not greater than the minimum test frequency limit (326) of the test. Graph line (331*c*) illustrates a set of test pairs in which the minimum test frequency (332) in the set is equal to the minimum test frequency limit (326). Graph line (331*d*) illustrates a set of test pairs having a subset (334) of test pairs with voltage values outside the test range, pairs that are therefore excluded from the test set represented by line (331*d*). The minimum test frequency (336) in the test set represented by line (331*d*) therefore is now greater than the minimum test frequency limit (326)—so that testing by iteratively decreasing the voltage in the test sets ceases, and, optionally at least, testing can continue by iteratively increasing all the voltages in the test sets until testing returns to the nominal line.

Figure 6:
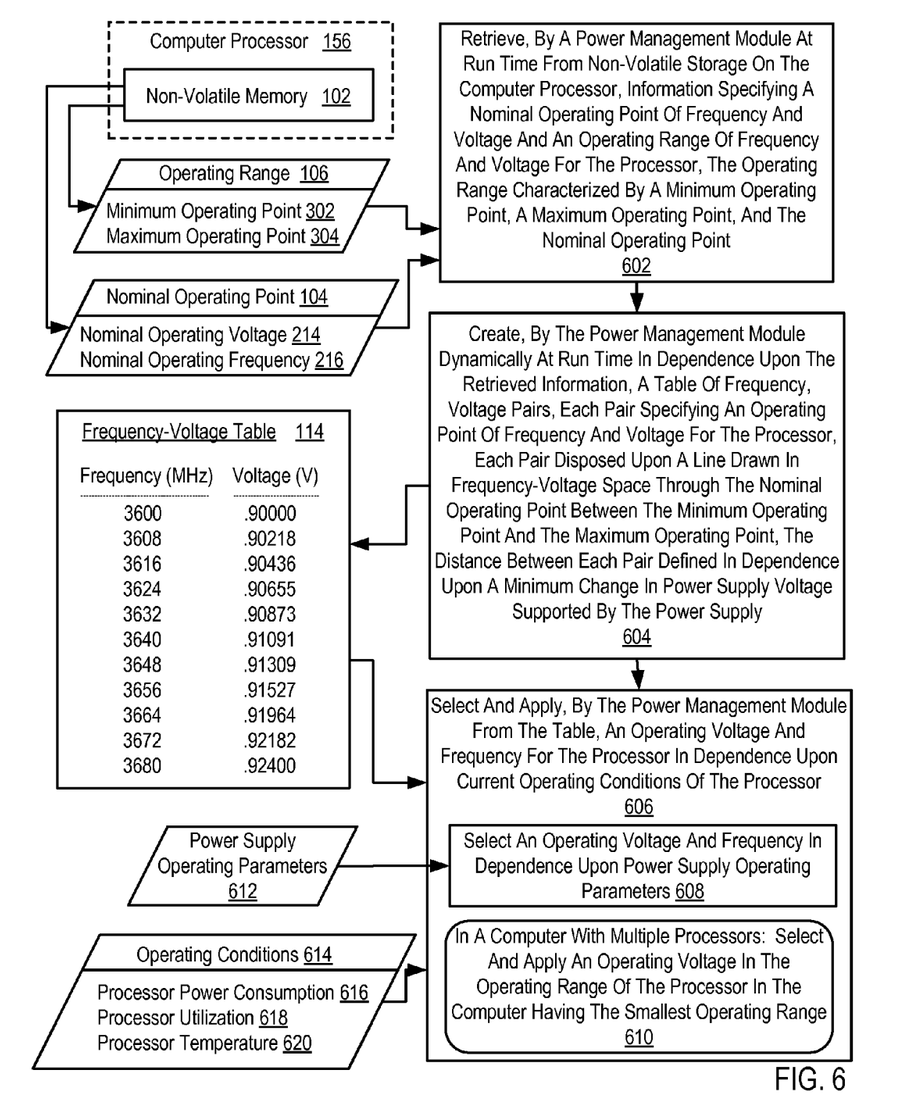
FIG. 6 sets forth a flow chart illustrating a further example method of dynamic frequency and voltage scaling for a computer processor according to embodiments of the present invention.

For further explanation, FIG. 6 sets forth a flow chart illustrating a further example method of dynamic frequency and voltage scaling for a computer processor according to embodiments of the present invention. The method of FIG. 6 is implemented upon a programmable computer having one or more computer processors operatively coupled to computer memory, a computer similar to the one described above with reference to FIG. 1, for example. The method of FIG. 6 includes retrieving (602), by a power management module at run time from non-volatile storage (102) on the computer processor (156), information specifying a nominal operating point (104) of frequency and voltage and an operating range of frequency and voltage for the processor. In the method of FIG. 6, the operating range is characterized by a minimum operating point (302), a maximum operating point (304), and the nominal operating point (104). The power management module includes a set of computer program instructions capable of retrieving information from the non-volatile storage on the computer processor. In the method of FIG. 6, the stored information specifying the nominal operating point includes a nominal operating voltage (214) and a nominal operating frequency (216). In the method of FIG. 6, the minimum operating point (304) and the nominal operating point (104) can include, for example, a minimum operating voltage, a minimum operating frequency, a maximum operating voltage, and a maximum operating frequency.

The method of FIG. 6 includes creating (604), by the power management module dynamically at run time in dependence upon the retrieved information, a table (114) of frequency, voltage pairs. Creating a table of frequency, voltage pairs can be carried out, for example, by inserting an entry in the table for each frequency, voltage pair. In the method of FIG. 6, each pair specifies an operating point of frequency and voltage for the processor. An operating point of frequency and voltage for the processor identifies an operating frequency for the processor and the voltage required to support the processor operating at such an operating voltage. In the method of FIG. 6, each pair is disposed upon a line drawn in frequency-voltage space through the nominal operating point (104) between the minimum operating point (302) and the maximum operating point (304). FIG. 3A of the present application includes a graphical representation of such a line drawn in frequency-voltage space. In the method of FIG. 6, the distance between each pair is defined in dependence upon a minimum change in power supply voltage supported by the power supply. The minimum change in power supply voltage supported by the power supply can be a function of the power supply itself or a function of the minimum supported change in clock frequency. Consider, for example, an embodiment of the present application in which the power supply supports voltage steps of 0.001 Volts and the clock frequency can only be changed in intervals of 100 MHz. In such an example, assume that the change in operating voltage required to support an operating frequency change of 100 MHz is greater than 0.001 Volts. In this an example, the allowable clock frequency increments will limit the minimum change in power supply voltage because the power supply must increment voltage by more than 0.001 Volts to change the operating frequency and reach a new voltage, frequency pair.

The method of FIG. 6 includes selecting (606) and applying, by the power management module from the table, an operating voltage and frequency for the processor in dependence upon current operating conditions (614) of the processor. Applying an operating voltage and frequency can be carried out, for example, by increasing or decreasing the voltage supplied by a power supply, by increasing or decreasing the clock frequency or a system clock, or in any manner as will occur to those of skill in the art. In the method of FIG. 6, applying an operating voltage and frequency is carried out in dependence upon current operating conditions (614) of the processor. In the method of FIG. 6, the current operating conditions (614) include processor utilization (616), processor temperature (618), and processor power consumption (620). Processor utilization (616) can be defined as a number of instructions executed per unit of time, a percentage of time that the processor spends in idle mode. The processor itself typically tracks in available register on the processor itself numbers of actual working instructions executed as well as its own idle time—so that processor utilization can be, for example, a ratio of idling processor instructions to a number of actual working instructions executed during some period of time. Applying an operating voltage and frequency in dependence upon such conditions can include, for example, applying an operating voltage and frequency to increase processor utilization, to decrease processor temperature, to decrease processor power consumption, or in any other way as will occur to those of skill in the art.

The method of FIG. 6 also includes selecting (608) an operating voltage and frequency in dependence upon power supply operating parameters (612). Power supply operating parameters can include, for example, the amount of additional voltage that a power supply is capable of producing in a specified 'step,' the maximum voltage slew rate, or any other power supply operating parameter as will occur to those of skill in the art. Selecting (608) an operating voltage and frequency in dependence upon such parameters includes, for example, determining that a required voltage change exceeds the maximum allowed slewing rate and therefore breaking a voltage change between two frequency, voltage pairs down into smaller steps.

In the method of FIG. 6, the table of frequency, voltage pairs can be created, for example, according to:

$$1.\ V_n = (1-\alpha) * V_{min} + \alpha * V_{nom},\ \text{where}\ \alpha = \frac{f_n - f_{min}}{f_{nom} - f_{min}},$$

where $f_{min}$ represents a minimum operating frequency of the computer processor that is within the operating range, $f_{nom}$ represents the nominal operating frequency of the computer processor, $V_{min}$ represents the voltage necessary to support the computer processor operating at a frequency $f_{min}$, and $V_{nom}$ represents the voltage necessary to support the computer processor operating at a frequency $f_{nom}$. Formula 1 represents an example method of calculating a frequency, voltage pair defined by an operating frequency $f_n$ and an operating voltage $V_n$ that represents the voltage necessary to support the computer processor operating at a frequency $f_n$. Iteratively applying Formula 1 over a range of $\alpha$, that is, over a range of $f_n$, generates a sequence of frequency voltage pairs, $f_n, V_n$, with the voltage values a function of changing frequency values.

Alternatively in the method of FIG. 6, the table of frequency, voltage pairs can also be created according to:

$$2.\ f_n = (1-\alpha) * f_{min} + \alpha * f_{nom},\ \text{where}\ \alpha = \frac{V_n - V_{min}}{V_{nom} - V_{min}},$$

where $f_{min}$ represents a minimum operating frequency of the computer processor that is within the operating range, $f_{nom}$ represents the nominal operating frequency of the computer processor, $V_{min}$ represents the voltage necessary to support the computer processor operating at a frequency $f_{min}$, and $V_{nom}$ represents the voltage necessary to support the computer processor operating at a frequency $f_{nom}$. Formula 2 represents an alternative method of calculating a frequency, voltage pair defined by an operating frequency $f_n$ and an operating voltage $V_n$ that represents a voltage that supports the computer processor operating at a frequency $f_n$. In the method of FIG. 6, a frequency, voltage pair can be calculated according to Formula 2 by iteratively calculating frequency $f_n$ over a range of $\alpha$, that is, over a range of $V_n$. Iteratively applying Formula 2 over a range of $V_n$ generates a sequence of frequency voltage pairs, $f_n, V_n$, with the frequency values a function of changing voltage values.

A computer that implements dynamic frequency and voltage scaling according to embodiments of the present invention can do so with more than one computer processor. That is, such a computer, like the example computer of FIG. 1, can be implemented as a computer with more than one computer processor (156, 157 on FIG. 1), where each processor includes information specifying a nominal operating point and an operating range for each processor. In some computers, each processor may have its own separate power supply and be driven by its own separate processor clock, in which case, the computer can carry out dynamic frequency and voltage scaling according to embodiments of the present invention separately for each processor in the computer. When, however, a computer with multiple processors, like the example of FIG. 1, has each processor supplied by the same power supply (108 on FIG. 1) and each processor driven by the same system clock (110 on FIG. 1), the process of dynamic frequency and voltage scaling according to embodiments of the present invention is interrelated among the processors. In such a computer, the nominal operating points and the operating ranges specified in storage on each processor typically will be different across the processors. On such a computer, with multiple processors driven by the same clock and powered by the same power supply, the method of FIG. 6 is therefore carried out by selecting and applying (608) an operating voltage in the operating range of only one of the processors in the computer, that is, the processor having the smallest operating range. One processor, for example, may be characterized by a minimum operating frequency of 3 GHz and a minimum operating voltage of 0.9 Volts. Another processor may be characterized by a minimum operating frequency of 3 GHz and a minimum operating voltage of 0.8 Volts. In such an example, to support an operating frequency of 3 GHZ an operating voltage of 0.9 Volts should be applied to the processors in spite of the fact that the second processor only requires 0.8 Volts to support such an operating frequency. In such an example, applying an operating voltage of 0.8 Volts to the processors would cause the first processor to fail as the first processor is not able to support its minimum operating frequency at such an operating voltage.

Exemplary embodiments of the present invention are described largely in the context of a fully functional computer system for dynamic frequency and voltage scaling for a computer processor. Readers of skill in the art will recognize, however, that the present invention also may be embodied in a computer program product disposed on computer readable, signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of dynamic frequency and voltage scaling for a computer processor, the computer processor operatively coupled to a power supply and to a system clock, the method comprising:

retrieving, by a power management module at run time from non-volatile storage on the computer processor, information specifying a nominal operating point of frequency and voltage and an operating range of frequency and voltage for the processor, the operating range characterized by a minimum operating point, a maximum operating point, and the nominal operating point;

creating, by the power management module dynamically at run time in dependence upon the retrieved information, a table of frequency, voltage pairs, each pair specifying an operating point of frequency and voltage for the processor, wherein said creating the table of frequency, voltage pairs comprises creating the table in accordance with one of, $$V_n = (1-\alpha) * V_{min} + \alpha * V_{nom}, \text{ where } \alpha = \frac{f_n - f_{min}}{f_{nom} - f_{min}},$$

and $$f_n = (1-\alpha) * f_{min} + \alpha * f_{nom}, \text{ where } \alpha = \frac{V_n - V_{min}}{V_{nom} - V_{min}},$$

$f_n$ represents an operating frequency of the computer processor, $f_{min}$ represents a minimum operating frequency of the computer processor that is within the operating range, $f_{nom}$ represents the nominal operating frequency of the computer processor, $V_n$, represents the voltage necessary to support the computer processor operating frequency $f_n$, $V_{min}$ represents the voltage necessary to support the computer processor operating at a frequency $f_{min}$, and $V_{nom}$ represents the voltage necessary to support the computer processor operating at a frequency $f_{nom}$; and selecting and applying, by the power management module from the table, an operating voltage and frequency for the processor in dependence upon current operating conditions of the processor.

2. The method of claim 1 wherein the operating conditions further comprise processor utilization, processor temperature, and processor power consumption.

3. The method of claim 1 wherein selecting an operating voltage and frequency for the processor further comprises selecting an operating voltage and frequency in dependence upon power supply operating parameters.

4. The method of claim 1 wherein:

the processor is installed in a computer with one or more other processors, each processor having information specifying a nominal operating point and an operating range for each processor, each processor supplied by the same power supply and each processor driven by the same system clock; and selecting and applying an operating voltage and frequency for the processor in dependence upon current operating conditions of the processor further comprises selecting and applying an operating voltage in the operating range of the processor in the computer having the smallest operating range.

5. Apparatus for dynamic frequency and voltage scaling for a computer processor, the apparatus comprising a computer memory operatively coupled to the computer processor, the computer processor operatively coupled to a power supply and to a system clock, the computer memory having disposed within it computer program instructions capable of:

retrieving, by a power management module at run time from non-volatile storage on the computer processor, information specifying a nominal operating point of frequency and voltage and an operating range of frequency and voltage for the processor, the operating range characterized by a minimum operating point, a maximum operating point, and the nominal operating point;

creating, by the power management module dynamically at run time in dependence upon the retrieved information, a table of frequency, voltage pairs, each pair specifying an operating point of frequency and voltage for the processor, wherein said creating the table of frequency, voltage pairs comprises creating the table in accordance with one of, $$V_n = (1-\alpha) * V_{min} + \alpha * V_{nom}, \text{ where } \alpha = \frac{f_n - f_{min}}{f_{nom} - f_{min}},$$

and $$f_n = (1-\alpha) * f_{min} + \alpha * f_{nom}, \text{ where } \alpha = \frac{V_n - V_{min}}{V_{nom} - V_{min}},$$

where:

$f_n$ represents an operating frequency of the computer processor, $f_{min}$ represents a minimum operating frequency of the computer processor that is within the operating range, $f_{nom}$ represents the nominal operating frequency of the computer processor, $V_n$, represents the voltage necessary to support the computer processor operating frequency $f_n$, $V_{min}$ represents the voltage necessary to support the computer processor operating at a frequency $f_{min}$, and $V_{nom}$ represents the voltage necessary to support the computer processor operating at a frequency $f_{nom}$; and selecting and applying, by the power management module from the table, an operating voltage and frequency for the processor in dependence upon current operating conditions of the processor.

6. The apparatus of claim 5 wherein the operating conditions further comprise processor utilization, processor temperature, and processor power consumption.

7. The apparatus of claim 5 wherein selecting an operating voltage and frequency for the processor further comprises selecting an operating voltage and frequency in dependence upon power supply operating parameters.

8. The apparatus of claim 5 wherein:

the processor is installed in a computer with one or more other processors, each processor having information specifying a nominal operating point and an operating range for each processor, each processor supplied by the same power supply and each processor driven by the same system clock; and selecting and applying an operating voltage and frequency for the processor in dependence upon current operating conditions of the processor further comprises selecting and applying an operating voltage in the operating range of the processor in the computer having the smallest operating range.

9. A computer program product for dynamic frequency and voltage scaling for a computer processor, the computer processor operatively coupled to a power supply and to a system clock, the computer program product disposed in a signal bearing medium, the computer program product comprising computer program instructions capable of:

retrieving, by a power management module at run time from non-volatile storage on the computer processor, information specifying a nominal operating point of frequency and voltage and an operating range of frequency and voltage for the processor, the operating range characterized by a minimum operating point, a maximum operating point, and the nominal operating point;

creating, by the power management module dynamically at run time in dependence upon the retrieved information, a table of frequency, voltage pairs, each pair specifying an operating point of frequency and voltage for the processor, wherein said creating the table of frequency, voltage pairs comprises creating the table in accordance with one of, $$V_n = (1-\alpha) * V_{min} + \alpha * V_{nom}, \text{ where } \alpha = \frac{f_n - f_{min}}{f_{nom} - f_{min}},$$

and $$f_n = (1-\alpha) * f_{min} + \alpha * f_{nom}, \text{ where } \alpha = \frac{V_n - V_{min}}{V_{nom} - V_{min}},$$

where:

$f_n$ represents an operating frequency of the computer processor, $f_{min}$ represents a minimum operating frequency of the computer processor that is within the operating range, $f_{nom}$ represents the nominal operating frequency of the computer processor, $V_n$, represents the voltage necessary ti support the computer processor operating frequency $f_n$, $V_{min}$ represents the voltage necessary to support the computer processor operating at a frequency $f_{min}$, and $V_{nom}$ represents the voltage necessary to support the computer processor operating at a frequency $f_{nom}$; and selecting and applying, by the power management module from the table, an operating voltage and frequency for the processor in dependence upon current operating conditions of the processor.

10. The computer program product of claim 9 wherein the signal bearing medium comprises a recordable medium.

11. The computer program product of claim 9 wherein the signal bearing medium comprises a transmission medium.

12. The computer program product of claim 9 wherein the operating conditions further comprise processor utilization, processor temperature, and processor power consumption.

13. The computer program product of claim 9 wherein selecting an operating voltage and frequency for the processor further comprises selecting an operating voltage and frequency in dependence upon power supply operating parameters.

14. The computer program product of claim 9 wherein:

the processor is installed in a computer with one or more other processors, each processor having information specifying a nominal operating point and an operating range for each processor, each processor supplied by the same power supply and each processor driven by the same system clock; and selecting and applying an operating voltage and frequency for the processor in dependence upon current operating conditions of the processor further comprises selecting and applying an operating voltage in the operating range of the processor in the computer having the smallest operating range.

* * * * *